2 Sheets—Sheet 1.

G. F. BLAKE.

Assignor to G. F. Blake Manufacturing Company.

VALVES AND GEAR FOR DIRECT-ACTING ENGINES.

No. 7,813. Reissued July 24, 1877.

Witnesses.

E. A. Perkins.

W. J. Pratt.

Inventor.

George F. Blake per Crosby & Gregory Attys

2 Sheets—Sheet 2.

G. F. BLAKE.

Assignor to G. F. Blake Manufacturing Company.

VALVES AND GEAR FOR DIRECT-ACTING ENGINES.

No. 7,813. Reissued July 24, 1877.

Witnesses
E. A. Perkins.
H. J. Pratt.

Inventor
George F. Blake
per Crosby & Gregory Attys

UNITED STATES PATENT OFFICE.

GEORGE F. BLAKE, OF BOSTON, MASSACHUSETTS, ASSIGNOR TO GEORGE F. BLAKE MANUFACTURING COMPANY.

IMPROVEMENT IN VALVES AND GEAR FOR DIRECT-ACTING ENGINES.

Specification forming part of Letters Patent No. 60,852, dated January 1, 1867; Reissue No. 7,813, dated July 24, 1877; application filed June 13, 1877.

*To all whom it may concern:*

Be it known that I, GEORGE F. BLAKE, of the city of Boston, in the State of Massachusetts, have invented certain new and useful Improvements in Steam-Pumps; and I do hereby declare the following to be a full and correct description of the same, reference being had to the accompanying drawings, in which—

Figure 1:
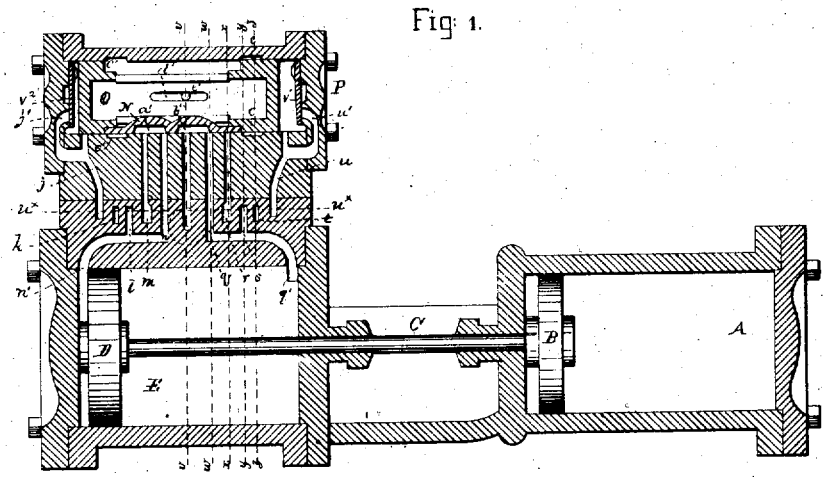
Figure 3:
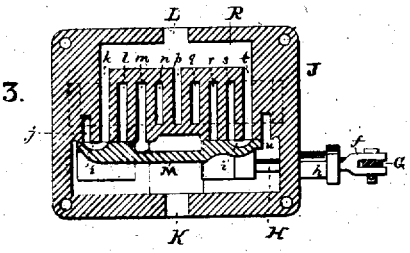
Figure 2:
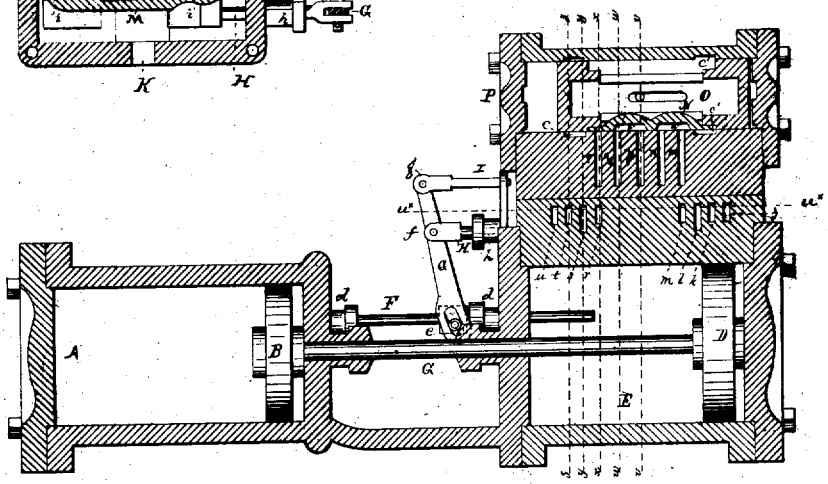
Figure 6:
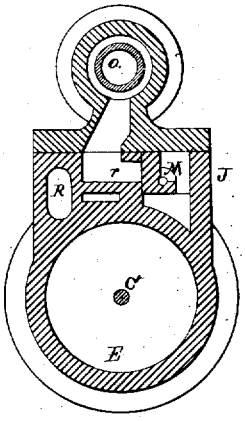
Figure 7:
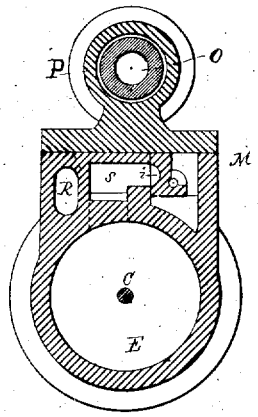
Figure 8:
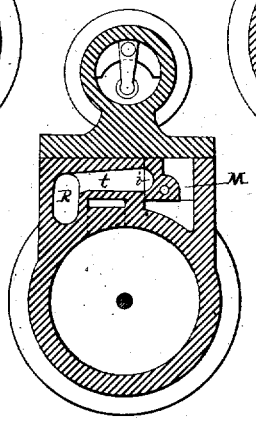
Figure 10:
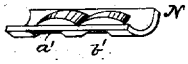
Figure 9:
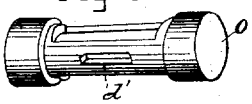
Figure 4:
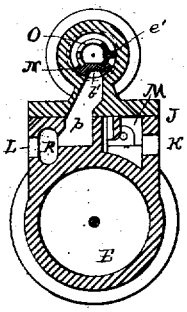
Figure 5:
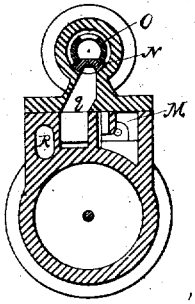

Figure 1 is a longitudinal vertical central section of the engine and pump looking toward the left side. Fig. 2 is a similar section looking toward the right side. Fig. 3 is a horizontal section on the line $u^{\times}$ $u^{\times}$ of Figs. 1 and 2. Fig. 4 is a transverse vertical section on line $v$ $v$ of Figs. 1 and 2. Fig. 5 is a similar section on line $w$ $w$ of said figures. Fig. 6 is a similar section on line $x$ $x$ of the same. Fig. 7 is a similar section on line $y$ $y$ of the same. Fig. 8 is a similar section on line $z$ $z$ of the same. Fig. 9 is a perspective view of the auxiliary piston of the upper cylinder, and Fig. 10 is a similar view of the valve which is operated by said piston.

One portion of this invention consists in the combination, with the main valve, the auxiliary piston, and the main ports, of the auxiliary valve, the ports covered by it, and the ports $k$ and $t$, which serve the purpose of exhaust-ports for the main cylinder, as hereinafter set forth.

By supplying the main cylinder promptly with steam when its piston nears the end of its stroke, and by the peculiar method of "cutting off" the pounding of such piston against the cylinder-head, which is so common and injurious in steam-pumping engines, is prevented.

The invention also has reference to the combination of the auxiliary piston and main valve, as hereinafter described, so that they may be moved over and be supported upon the same curved surface.

To enable others to make and use my improved steam-pump, I will proceed to describe its construction and operation, referring to the drawings.

A designates the pump-cylinder; E, the steam-cylinder; B, the pump-piston; D, the steam-piston, and C the piston-rod connecting them. F is a tappet-rod, which extends from one to the other cylinder, as shown in Fig. 2, it being adapted to move freely, but steam-tight, through the stuffing-boxes $d$ $d$, in obedience to impulses received alternately and at intervals from the pistons B and D.

Attached by a slotted joint to the tappet-rod is a swinging lever, G, which is pivoted at $g$ to the standard I.

To this lever is also pivoted, through a slot at $f$, the valve-rod H, which passes into the steam-chest J through the stuffing-box $h$. K marks the main inlet-port, and L the main exhaust-outlet. M is the small slide-valve, and N the main valve, which is carried by the auxiliary cylindrical piston O in the auxiliary cylinder P.

The valve M is a flat slide-valve of the ordinary kind, having two cups, $i$ $i$, and it controls the ports which supply and exhaust the auxiliary cylinder P, and also the additional exhaust-ports of the main cylinder.

The main valve N, (see Figs. 1, 2, and 10,) made as a segment of a cylinder, controls the supply and exhaust ports of the main cylinder, and also, in conjunction with valve M, acts as a cut-off, as will be hereinafter explained.

The plain surfaces of the main valve are shown as projecting at each end some distance beyond the cups $a'$ and $b'$.

The auxiliary piston O (see Fig. 9) is a hollow cylinder, solid at each end, open at center, and provided with slots $d'$ in its sides to receive a pin, $e'$, which allows it to reciprocate in the auxiliary cylinder P, but prevents it from turning on its axis.

The valve N is received into the lower opening of the piston P, and moves with it.

The connection between the main valve N and the auxiliary piston is such that the valve is free to move radially with relation to the axis of the auxiliary piston, to keep its face against the valve-seat, and so as to move longitudinally with the piston during its reciprocations.

Steam-passages $c'$ $c'$ allow the free circulation of steam around the auxiliary piston between its ends, and thus equalizes the pressure on the valve N, and lessens its tendency to wear. These grooves $c'$ $c'$ also enable the valve-seat to be so separated from the interior surface of the cylinder that the valve may, in its reciprocation, wipe itself on the walls of such grooves.

The steam-ports are marked *j k l m n p q r s t u*. Of these, *j* leads from the steam-chest to the rear end of the auxiliary cylinder P. *k* is the exhaust for the auxiliary cylinder P, and the additional exhaust for the main cylinder, communicating, as seen in Fig. 3, with passage R, leading to exhaust-outlet L. The port *l* connects the steam-chest with the steamway *n'*, leading to the rear end of the main cylinder, and serves to connect that steamway with the auxiliary exhaust *k*. The port *m* is the supply-port for the rear end of cylinder E. The port *n* is alternately the supply and exhaust of the same end of that cylinder. The port *p* is the common exhaust for both ends of the main cylinder, and communicates directly with the steam-outlet L.

The ports on the forward end of the steam-chest correspond in arrangement and function with those already described at the rear end. The port *q* corresponds with *n*, *r* with *m*, *s* with *l*, *t* with *k*, and *u* with *j*.

The ports controlled by slide-valve M are those marked *j k l m* and *r s t u*, and those controlled by the main valve N are those marked *m n p q r*. The ports common to the two valves are those marked *m* and *r*.

The course of the steam is as follows: When the valve M is in the position shown in Fig. 3, steam passes through port *m*, under valve N, through port *n*, and passage *n'*, into the rearward end of cylinder E, driving the piston D toward the forward end of the cylinder. At the same time the exhaust takes place through passage *q'*, port *q*, under valve N, through port *p*, and outlet L.

The additional exhaust also takes place simultaneously through port *s*, under valve M, and through port *t* into steamway R, and out at main outlet L, thus facilitating the rapid discharge of steam from the end of the main cylinder toward which the piston is moving.

When piston D is moved forward far enough to strike the tappet-rod F, then port *j* is uncovered by valve M, and the end of the auxiliary cylinder P takes steam through passage *j'*, and under the spring-valve $v^2$, it then opening under the pressure of the steam. The auxiliary piston O is driven forward, and at the opposite end the steam is exhausted through ports *u* and *t*, which are connected by valve M. The forward end of the main cylinder then takes steam through ports *r*, *q*, and *q'*, which are connected by the main valve N, port *r* being then uncovered by valve M for the passage of steam from the steam-chest.

The main exhaust of the main cylinder takes place through ports *n* and *p*, connected by valve N, and the additional exhaust of the same end is through ports *l* and *k*, connected by valve M.

When the ports *u* and *j'* are not covered by the auxiliary piston, the spring-valve $v^1$ and $v^2$ are closed, as the pressure is the same on both sides; consequently, when the auxiliary piston approaches either end of its cylinder, a certain amount of steam is entrapped between the end of the piston and head after it has covered the exhaust-port *u* or *j'*, forming an elastic cushion.

The main valve N not only serves to regulate the supply and exhaust of the main cylinder in the ordinary way, but co-operates with valve M in forming a cut-off. The valve being prolonged at the ends beyond the cups *a'* *b'*, those prolongations serve, at a proper period of the stroke, as a cut-off, by preventing the flow of steam through the supply-ports *m* and *r*, alternately, to the ends of the main cylinder, with which those ports respectively connect.

In the drawings, this valve is shown as t[illegible] closing the upper end of port *r*, while the lower end of the same port is closed by valve M. Thus, before the piston gets to the end of its stroke, the supply of steam behind it is cut off, and that end of the cylinder put in communication with the auxiliary and main exhaust-ports.

In this way the objectionable pounding of the piston against the end of the cylinder is avoided, and the piston is caused to respond quickly to the change of valves.

The construction of the main valve and auxiliary piston, as herein described, admits of both being easily removed by taking off the heads of the auxiliary cylinder.

I do not claim a tubular tappet-rod adapted to surround the main piston-rod, and arranged to move thereon without a packing between them to prevent the passage of steam from one to the other cylinder.

Having thus fully described my invention, what I claim, and desire to secure by Letters Patent, is—

1. In a steam-pump provided with two pistons connected by a piston-rod sustained in stuffing-boxes in the cylinder-heads the combination with the main piston-rod, of an independent tappet-rod parallel with but removed from contact with the main piston-rod, and connections substantially as described between such tappet-rod and the auxiliary valves to operate as set forth.

2. The lever G, pivoted at *g*, in combination with the tappet-rod, and the rod H, connected with and to operate the double auxiliary valve during the movement of, and in the direction of the movement of, the steam-piston, substantially as set forth.

3. In combination, the main valve, the auxiliary piston, the main ports, the auxiliary valve, the ports covered by it, and the ports *k* and *t*, which serve the purpose of exhaust-ports for the main cylinder, the combination being and operating substantially as described.

4. The auxiliary piston and the segmental main valve connected loosely therewith, in combination with the auxiliary cylinder and its segmental or curved seat, adapted to sustain both the auxiliary piston and the main valve on the same curved surface, substantially as described.

5. In a steam-pump, a single segmental or curved valve-seat, extended from end to end of the auxiliary cylinder, and provided with ports *r q p m n*, in combination with the main valve and its loosely-connected auxiliary piston, both adapted to rest upon and be reciprocated over and in contact with the same curved seat, substantially as set forth.

6. The combination, with an auxiliary valve and its seat, provided with ports leading to the auxiliary cylinder, of the main valve and main cylinder, whereby a single valve serves to operate the main valve to cut off steam from the main cylinder, and as an additional exhaust from said cylinder.

GEO. F. BLAKE.

Witnesses:
G. W. GREGORY,
W. J. PRATT.